Oct. 21, 1969 R. E. MILFORD 3,474,251

PHOTOCELL AMPLIFIER

Filed June 30, 1966

INVENTOR.
RICHARD E. MILFORD

United States Patent Office 3,474,251

Patented Oct. 21, 1969

3,474,251

PHOTOCELL AMPLIFIER

Richard E. Milford, Phoenix, Ariz., assignor to General Electric Company, a corporation of New York Filed June 30, 1966, Ser. No. 561,958

Int. Cl. H03k *17/04*

U.S. Cl. 250—214 10 Claims

ABSTRACT OF THE DISCLOSURE

A capacitive coupling circuit and a variable impedance adapt a slow responding photoconducting cell to high frequency operation.

Figure 1:
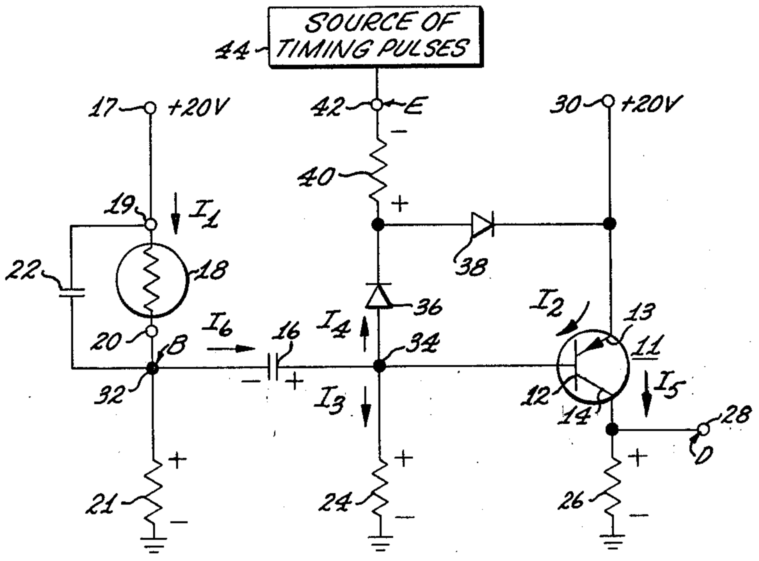

This invention relates to photocell amplifiers and more particularly to amplifier circuits which adapt slow responding photoconductive cells to high frequency applications.

In electronic data processing systems, information bearing media such as punched cards and punched tapes are widely used for storing information. Equipment known as card readers and paper tape readers are used for photoelectrically generating electric signals which correspond to information stored on cards or tapes passing between a light source and a reading head. These reading heads may employ suitable light responsive elements such as photoelectric cells or phototransistors to detect the presence or absence of holes at particular locations of the information bearing media. For example, in punched cards the holes are usually rectangular in shape and may be closely spaced leaving between them a narrow "web" of card material. The reading head develops an electric signal which is intended to be a representation of the pattern of holes and web of the punched card being read.

In order that information read from a card may be synchronously transferred to a data processor, some system must be provided for generating a timing pulse for each of the possible hole locations of the card. One such system employs a movable belt having a plurality of holes arranged to move between a light source and a sensor. The card being read pushes the movable belt past the sensor which generates a timing pulse as each of the possible hole locations in the card moves past the reading head.

The photoelectric cells employed in the reading heads may be photovoltaic cells or photoconductive cells. Prior art reading heads used in high speed card readers often employ photovoltaic cells comprised of silicon. These silicon photovoltaic cells have an excellent high frequency response and produce a current that is proportional to the amount of light falling on the light sensitive surface; however, these silicon photovoltaic cells are relatively expensive and have a sensitivity of signal power output which is relatively low per unit of illumination. Thus, several stages of amplification may be employed to amplify the signal to a value which is usable by the data processing system. These stages of amplification cause the card reader amplifier circuits to be bulky and expensive.

The photoconductive cells comprised of cadmium are relatively low in cost and have an excellent sensitivity; however, their high frequency response is poor. When light falls on a photoconductive cell, current through the cell increases exponentially to a maximum value which is proportional to the amount of light falling on the light sensitive surface. When light no longer falls on the photoconductive cell, current through the cell decreases exponentially to a minimum value. An appreciable amount of time is required for the current to change between the maximum and the minimum values thereby causing card readers employing these photoconductive cells in prior art circuits to have a speed of operation which is much lower than is possible using photovoltaic cells. What is needed is a circuit which can utilize the excellent sensitivity of the low cost photoconductive cell and adapt these cells for high frequency operation.

The present invention alleviates the disadvantages of the prior art by providing an amplifier circuit which adapts the slow responding photoconductive cell to high frequency applications. This is done by capacitively coupling the photoconductive cell to a low impedance at the input terminal of the amplifier. The low impedance insures that a current supplied through a capacitor to the amplifier is proportional to the rate of change in current through the cell. This current through the capacitor produces a voltage which causes the amplifier to develop an output voltage whose value is determined by the direction of current flow through the capacitor.

It is therefore an object of this invention to provide a circuit which adapts a slow responding photoconductive cell to high frequency applications.

Another object of this invention is to provide a capacitively coupled circuit which adapts a slow responding photoconductive cell to high frequency applications.

The foregoing objects are achieved in the instant invention by providing a new and improved photoconductive amplifier circuit which effectively increases the frequency response of a photoconductive cell. The amplifier circuit employs a transistor which is biased in a saturated condition. The photoconductive cell is capacitively coupled to the base of the transistor and provides a current through the capacitor when there is a change in current through the photoconductive cell. The cell provides a current through the capacitor to the transistor while light falling on the cell causes the current through the cell to increase, and provides a current in the opposite direction through the capacitor while an absence of light on the cell causes the current through the photoconductive cell to decrease. The current through the capacitor to the transistor provides a voltage which renders the transistor nonconductive and the current in the opposite direction through the capacitor renders the transistor saturated. Thus, even if the holes and web of a card pass between the light source and the photoconductive cell at a speed great enough so that the current through the photoconductive cell changes only a fraction of the entire range between the maximum and the minimum values, the transistor is switched between the saturated and the nonconductive conditions each time a hole passes between the light source and the photoconductive cell. The transistor produces a high frequency signal from a slow responding photoconductive cell so that a card reader employing the circuit of the instant invention can be operated at a speed many times the speed of a card reader employing prior art circuits using photoconductive cells. The amplifier circuit of the instant invention employs a photoconductive cell and a single transistor to produce an electrical signal having a value as large as the signal produced by a photovoltaic cell and additional stages of amplification.

Figure 2:
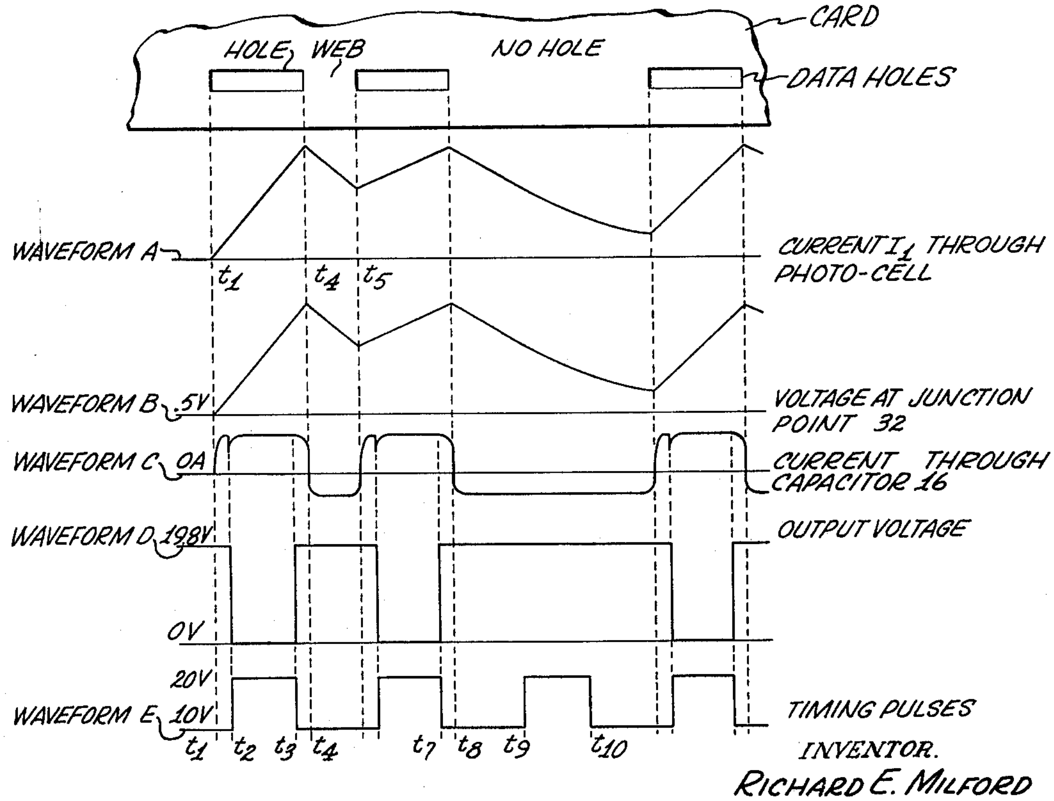

Other objects and advantages of this invention will become apparent from the following description when taken in connection with the accompanying drawings wherein:

FIG. 1 is a schematic diagram of a photocell amplifier embodying the instant invention; and FIG. 2 illustrates waveforms which are useful in explaining the operation of the circuit shown in FIG. 1.

Referring more particularly to the drawing by characters of reference, FIG. 1 discloses a photocell amplifier for adapting slow responsing photoconductive cells to high frequency applications. As indicated in FIG. 1, a transistor 11, comprising a control electrode or base 12, a first output electrode or emitter 13 and a second output electrode or collector 14, is capacitively coupled by a capacitor 16 to a photoconductive cell 18 having a pair of terminals 19 and 20. Since cell 18 is of the photoconductive type, the first terminal 19 of the cell is connected to a first reference potential or source of voltage such as +20 volts and the second terminal 20 of the cell is coupled through a resistor 21 to a second reference potential such as ground. A capacitor 22 is connected between terminals 18 and 19 of cell 18 to filter out high frequency noise which may be coupled into the circuit from an external source, such as a power supply. The upper plate of capacitor 22 is connected to the +20 volt source which is also connected to the emitter of transistor 11. The lower plate of capacitor 22 is connected to junction point 32. This causes capacitor 22 to filter out noise which may develop between junction point 32 and the emitter of transistor 11 and reduces noise between the base and the emitter of transistor 11.

The transistor is arranged to be in a saturated condition before the holes in the information bearing media, such as cards, pass between the reading head of a card reader and its light source (not shown). This condition is desirable since an increase in light falling on the cell 18 increases the current through the cell and produces an increase in voltage at junction point 32. A portion of this increase in voltage is coupled through capacitor 16 to base 12 and causes transistor 11 to be switched into the nonconductive condition. When a decrease in light falling on cell 18 causes a decrease in current through cell 18, the voltage at junction point 32 decreases. A portion of this decrease in voltage is coupled through the capacitor 16 to base 12 of transistor 11 thereby causing transistor 11 to again operate in a saturated condition. In order to properly bias transistor 11, emitter 13 is connected to a first reference potential such as a +20 volts, and base 12 is connected through a suitable biasing means such as resistor 24 to ground. In order for an output signal to develop, a load resistor 26 is connected between collector 14 and ground and an output terminal 28 is connected to collector 14 of transistor 11.

Before holes in the information bearing cards pass between the light source (not shown) and the photoconductive cell 18, a small but substantially constant amount of ambient light falls on the light sensitive surface of cell 18. This light falling on cell 18 causes a small current $I_1$ to flow from terminal 17 through cell 18 and resistor 21 to ground thereby developing a constant voltage drop of the polarity shown across the resistor 21. Before holes in the card pass between the light source and the photoconductive cell 18, the voltage drop across resistor 21 and the voltage at junction point 32 is approximately +.5 of a volt. This is shown in waveform B of FIG. 2 as being prior to time $t_1$.

While the voltage at junction point 32 is constant, a bias current $I_2$ flows from terminal 30 to emitter 13, through emitter 13, and base 12 to junction point 34 where it divides. A current $I_3$ flows from junction point 34 through resistor 24 to ground and another current $I_4$ flows from junction point 34 through diode 36 and resistor 40 to a source of timing pulses 44. The value of the voltage at terminal 42 and the value of resistor 24 and 40 determine the value of current $I_2$ and are selected so that transistor 11 operates in a saturated condition. The voltage drop between emitter 13 and base 12 of transistor 11 is approximately +.6 of a volt when the transistor 11 is conductive resulting in a 19.4 volt drop across resistor 24. Thus, the voltage at junction point 34 is approximately +19.4 volts which is 18.9 volts more positive than the voltage at junction point 32 so that 18.9 volts of the polarity shown is developed across capacitor 16. Bias current $I_2$ from emitter to base renders transistor 11 conductive so that a current $I_5$ flows from the +20 volt source through emitter 13, collector 14 and load resistor 26 to ground. Current $I_5$ provides the voltage polarity shown across resistor 26 thereby providing a positive output voltage at output terminal 28. While transistor 11 operates in a saturated condition, there is a voltage drop of approximately +.2 of a volt between emitter 13 and collector 14 and as a result there is a voltage drop of approximately +19.8 volts across load resistor 26. The value of this output voltage is shown prior to time $t_1$ in waveform D of FIG. 2.

When a hole in the information bearing cards allows light from a source (not shown) to fall on photoconductive cell 18, current $I_1$ through photocell 18 increases at an exponential rate. The first portion of an exponential curve is substantially linear so that a hole in a card moving at a high rate of speed past photocell 18 would cause light to fall on photoconductive cell 18 only long enough for the current $I_1$ to increase in the linear manner shown between time $t_1$ and time $t_4$ in waveform A of FIG. 2. This increase in current $I_1$ through cell 18 causes an increases in the voltage drop across resistor 21 which increases the voltage at junction point 32. The increase in voltage at junction point 32 causes a current $I_6$ to flow from junction point 32 through capacitor 16 to junction point 34. The value of capacitor 16 is selected such that the value of current $I_6$ is small compared to the value of current $I_1$ so that current $I_6$ does not appreciably load the photocell circuit and does not appreciably change the voltage waveform at junction point 32.

$$\text{Current } I_6 = C\frac{dv}{dt}$$

where $dv/dt$ is the rate of change of the voltage across capacitor 16 and C is the value of capacitor 16. A typical value of capacitor 16 is .062 microfarad.

The source of timing pulses 44 provides a high voltage which back biases diode 36 and causes diode 36 to be nonconductive during the time that it is desired to detect the presence or absence of a hole by sensing the rate of change of current in photoconductive cell 18. When diode 36 is nonconductive, all of current $I_6$ which flows from junction point 32 through capacitor 16 to junction point 34 flows through resistor 24 to ground. Resistor 24 provides a high impedance between junction point 34 and ground as a typical value of resistor 24 is 950K ohms. This high impedance causes current $I_6$ to develop a sufficient voltage across resistor 24 so that transistor 11 is rendered nonconductive while current in photoconductive cell 18 increases. Source 44 provides a lower voltage which renders diode 36 conductive so that current from junction point 34 flows through resistor 40 and provides a lower impedance at junction point 34 during the time that it is not desired to sense the rate of change of this current. A typical value of resistor 40 is 5K ohms.

When the voltage at junction point 32 increases but it is not desired to sense the rate of change of current in photoconductive cell 18, for example, between time $t_1$ and $t_2$ (FIG. 2), source 44 provides a low voltage level at terminal 42. Diode 36 is conductive so that substantially all of current $I_6$ which flows from junction point 32 to junction point 34, now flows through diode 36 and resistor 40 to terminal 42. Resistor 40 provides a low impedance between junction point 34 and source 44. Current $I_6$ flowing from junction point 34 to terminal 42 produces a small voltage drop across resistor 40 and diode 36 so that the voltage at junction point 34 due to current $I_6$ is relatively low. This low voltage at junction point 34 causes current $I_2$ to flow from emitter 13 to base 12 thereby causing transistor 11 to operate in a saturated condition and to develop a voltage of approximately 19.8 volts at output terminal 28.

When it is desired to sense the rate of change of current in photoconductive cell 18, for example, at time $t_2$ (FIG. 2), source 44 provides a relatively high voltage level at terminal 42 thereby back biasing diode 36 and as a result, no current flows through diode 36. The current $I_6$ which flows through capacitor 16 now flows through resistor 24 so that there is an increase in voltage drop across resistor 24 and an increase in voltage at base 12 of transistor 11. The increase in voltage at base 12 decreases the voltage between emitter 13 and base 12 below the +.6 of a volt required to render transistor 11 conductive. Transistor 11 is rendered nonconductive so that no current flows through resistor 26 and the voltage at output terminal 28 is at ground potential. When transistor 11 is nonconductive and diode 36 is back biased resistor 24 provides a relatively high impedance between junction point 34 and ground. Current $I_6$ flowing through resistor 24 provides a relatively large positive voltage at base 12 of transistor 11 which could cause damage to the transistor. To prevent this diodes 36 and 38 are serially connected between base 12 and emitter 13 of transistor 11 to limit the value of the positive voltage applied to base 12 so that the voltage between base 12 and emitter 13 does not increase sufficiently to cause damage to transistor 11.

At the start of a period when it is not desired to sense the rate of change of current in photoconductive cell 18, for example, at time $t_3$ (FIG. 2) source 44 again provides a low voltage at terminal 42 so that diode 36 is no longer back biased and the impedance at junction point 34 is low. Current $I_6$ flows from junction point 32 through capacitor 16, diode 36 and resistor 40 to terminal 42. The voltage drop across resistor 24 decreases so that transistor 11 is again rendered conductive and the voltage at output terminal 28 is again +19.8 volts. Current $I_6$ partially discharges capacitor 16 to a value of voltage which is the difference between the voltage at junction point 34 and the voltage at junction point 32.

If source 44 and resistor 40 were not used in this circuit, current $I_6$ would discharge capacitor 16 at a much slower rate. The voltage across capacitor 16 and the voltage at junction point 32 would cause current $I_6$ to flow through capacitor 16 and resistor 24 to ground even when the voltage at junction point 32 decreases. For example, between time $t_5$ and time $t_7$ current $I_6$ would be so small that capacitor 16 would discharge only a small amount. Between time $t_7$ and $t_{10}$ capacitor 16 could continue to discharge through resistor 24 thereby providing sufficient voltage across resistor 24 to render transistor 11 nonconductive. This would give a false indication of a hole in the card being read. Thus, a means for changing impedance between the base of the transistor and ground is needed to provide accurate sensing of the pattern of holes in the punched card being read.

When a web of the card passes between the light source and the photoconductive cell 18 in the circuit of FIG. 1, only a small amount of light falls on the light sensitive surface of cell 18. Current $I_1$ through cell 18 decreases at an exponential rate so that the voltage drop across resistor 21 and the voltage at junction point 32 decrease at an exponential rate. The decrease in voltage at junction point 32 causes a current $I_7$ not shown, to flow from junction point 34 through capacitor 16 to junction point 32 opposite to the direction of $I_6$ shown in FIG. 1. Current $I_2$ from terminal 30 to emitter 13, base 12 to junction point 34 increases to a value larger than when the voltage at junction point 32 is constant. Because transistor 11 is biased in a saturated condition, an increase in emitter to base current $I_2$ has no appreciable effect on the value of collector current $I_5$ and the voltage at output terminal 28 remains at approximately 19.8 volts.

When there is no hole passing photoconductive cell 18 at the time it is desired to sense the rate of change of current in cell 18, for example, between time $t_9$ and $t_{10}$ (FIG. 2), source 44 provides a high voltage at terminal 42. The voltage at junction point 32 is not increasing so there is no current flowing from junction point 32 through capacitor 16 to junction point 34. Current $I_2$ flows from terminal 30 to emitter 13, through emitter 13 and base 12 to junction point 34 thereby causing transistor 11 to operate in a saturated condition as described above. Current $I_3$ flows from junction point 34 through resistor 24 to ground. The voltage at output terminal 28 is approximately 19.8 volts.

Thus, the amplifier circuit of the present invention changes the sloping waveform (waveform A) developed by the photoconductive cell 18 into a waveform (waveform D) which is an accurate representation of the pattern of holes in the punched card being read. This effectively increases the high frequency response of the photoconductive cell so that a card reader employing this amplifier circuit can operate at a speed many times greater than a similar card reader using prior art photoconductive cell circuits.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. An amplifier circuit which adapts a slow responding photoconductive cell to high frequency operation comprising: an amplifier device having first and second output electrodes and a control electrode; pulsing means for controlling the impedance at said control electrode of said device, said means being coupled to said control electrode of said device; a capacitor; means for connecting said capacitor between said cell and said control electrode of said device; and a biasing means, said biasing means being coupled to said control electrode of said device, said device being biased in a conductive condition by said biasing means.

2. An amplifier circuit which adapts a slow responding photoconductive cell to high frequency operation as defined in claim 1 wherein: said means for controlling the impedance at said control electrode of said device includes a source of timing pulses.

3. An amplifier circuit which adapts a slow responding photoconductive cell to high frequency operation as defined in claim 2 wherein: diode means is employed to couple said source of timing pulses to said control electrode of said device.

4. An amplifier circuit which adapts a slow responding photoconductive cell to high frequency operation as defined in claim 1 wherein: said device is operated in a saturated condition by said biasing means.

5. An amplifier circuit which adapts a slow responding photoconductive cell to high frequency operation as defined in claim 1 including: first and second reference potentials; first and second resistors, and wherein: said cell includes first and second terminals, said first terminal of said cell being connected to said first potential, said first resistor being connected between said second terminal of said cell and said second potential, said second resistor being connected between said second potential and said second output electrode of said device, and wherein said means for connecting said capacitor between said cell and said control electrode of said device includes means for connecting said capacitor between said second terminal of said cell and said control electrode of said device, said device being biased in a saturated condition by said biasing means.

6. An amplifier circuit which adapts a slow responding photoconductive cell to high frequency operation as defined in claim 1 wherein: said amplifier device comprises a transistor having a base, a collector and an emitter; and said amplifier circuit includes: first and second reference potentials; first and second resistors, and wherein said cell includes first and second terminals, said first terminal of said cell being connected to said first potential, said first resistor being connected between said second terminal of said cell and said second potential, said second resistor being connected between said second potential and said collector of said transistor, and wherein said means for connecting said capacitor between said cell and said control electrode of said device includes means for connecting said capacitor between said second terminal of said cell and said base of said transistor.

7. An amplifier circuit which adapts a slow responding photoconductive cell to high frequency operation as defined in claim 6 wherein: said transistor is operated in a saturated condition by said biasing means.

8. An amplifier circuit which adapts a slow responding photoconductive cell to high frequency operation comprising: a transistor having a base, a collector and an emitter; a photoconductive cell having first and second terminals; first, second and third resistors; first and second reference potentials, said first terminal of said cell being connected to said first potential, said first resistor being connected between said second terminal of said cell and said second potential; a capacitor, said capacitor being connected between said second terminal of said cell and said base of said transistor, said emitter of said transistor being connected to said first potential, said second resistor being connected between said base of said transistor and said second potential, said third resistor being connected between said collector of said transistor and said second potential; and an output terminal, said output terminal being connected to said collector of said transistor.

9. An amplifier circuit which adapts a slow responding photoconductive cell to high frequency operation as defined in claim 8 including: a means for controlling the impedance between said base of said transistor and said second potential, said means being coupled to said base of said transistor.

10. An amplifier circuit which adapts a slow responding photoconductive cell to high frequency operation as defined in claim 9 wherein: said means for controlling the impedance between said base of said transistor and said second potential includes: a source of timing pulses, a fourth resistor and a diode, said fourth resistor and said diode being serially connected between said source and said base of said transistor.

References Cited

UNITED STATES PATENTS

| | | | |
|---|---|---|---|
| 2,559,515 | 7/1951 | Pourcia | 250—214 X |
| 2,632,855 | 3/1953 | Bendz | 250—214 X |
| 3,208,001 | 9/1965 | Minner et al. | 330—31 X |
| 3,254,306 | 5/1966 | Carlson | 330—24 |
| 3,330,973 | 7/1967 | Clapper | 330—24 X |
| 3,333,106 | 7/1967 | Fischer | 250—206 X |
| 3,361,896 | 1/1968 | Antonio. | |
| 3,376,423 | 4/1968 | James. | |

RALPH G. NILSON, Primary Examiner

C. M. LEEDOM, Assistant Examiner

U.S. Cl. X.R.

250—219; 307—311; 330—24, 31